United States Patent [19]
Wakeman et al.

[11] Patent Number: 5,039,278
[45] Date of Patent: Aug. 13, 1991

[54] POWER TURBINE VENTILATION SYSTEM

[75] Inventors: Thomas G. Wakeman, Lawrenceburg, Ind.; Richard W. Brown, Cincinnati, Ohio

[73] Assignee: General Electric Company, Cincinnati, Ohio

[21] Appl. No.: 336,374

[22] Filed: Apr. 11, 1989

[51] Int. Cl.[5] .......................... B64C 11/06; B64C 11/14
[52] U.S. Cl. .......................................... 416/94; 416/239
[58] Field of Search ............... 416/93 R, 94, 128, 239; 415/115, 116; 60/39.162, 226.1, 268

[56] References Cited

U.S. PATENT DOCUMENTS

| | | | |
|---|---|---|---|
| 3,363,419 | 1/1969 | Wilde | 60/268 X |
| 3,631,672 | 1/1972 | Gentile et al. | 60/39.66 |
| 3,647,313 | 3/1972 | Koff | 415/115 |
| 4,190,397 | 2/1980 | Schilling et al. | 415/112 |
| 4,230,436 | 10/1980 | Davison | 415/1 |
| 4,488,399 | 12/1984 | Robey et al. | 416/93 R |
| 4,574,584 | 3/1986 | Hovan | 60/39.02 |
| 4,621,978 | 11/1986 | Stuart | 416/128 |
| 4,642,024 | 2/1987 | Weidner | 415/116 |

FOREIGN PATENT DOCUMENTS

| | | | |
|---|---|---|---|
| 2155114 | 9/1985 | United Kingdom | 416/94 |
| 2180009 | 3/1987 | United Kingdom | 416/94 |

*Primary Examiner*—Edward K. Look
*Assistant Examiner*—James A. Lawson
*Attorney, Agent, or Firm*—Jerome C. Squillaro; John R. Rafter

[57] ABSTRACT

Air control mechanism within a power turbine section of a gas turbine engine. The power turbine section includes a rotor and at least one variable pitch propulsor blade. The propulsor blade is coupled to and extends radially outwardly of the rotor. A first annular fairing is rotatable with the propulsor blade and interposed between the propulsor blade and the rotor. A second fairing is located longitudinally adjacent to the first fairing. The first fairing and the second fairing are differentially rotatable. The air control mechanism includes a platform fixedly coupled to a radially inner end of the propulsor blade. The platform is generally positioned in a first opening and a first fairing. The platform and the first fairing define an outer space. In a first position corresponding with a first propulsor blade pitch, the platform is substantially conformal with the first fairing. In a second position corresponding with the second propulsor blade pitch, an edge portion of the platform is displaced radially outwardly from the first fairing. When the blades are in the second position and rotating about the engine axis, the displacement of the edge portion with respect to the first fairing allows air to flow from the outer space to the annular cavity.

6 Claims, 3 Drawing Sheets

POWER TURBINE VENTILATION SYSTEM

The invention herein described was made in the performance of work under a NASA contract and is subject to the provisions of Section 305 of the National Aeronautics and Space Act of 1958, Public Law 85-568 (72 Stat. 435; USC 2457).

FIELD OF THE INVENTION

This invention relates generally to ventilation systems for gas turbine engines and, in particular, to ventilation systems for providing cooling air to the hub region of a rotatable propulsor blade.

BACKGROUND OF THE INVENTION

Two types of gas turbine engines currently available to power aircraft are the turbo-fan and turbo-prop engines. Common to both engines is the power generating unit, commonly referred to as the core engine. This unit typically includes a compressor section, a combustor, and a turbine section in serial flow relationship. Pressurized air from the compressor section is mixed with fuel and burned in the combustor to produce a high energy gas stream. The gas stream expands through a first turbine section where energy is extracted to operate the compressor. Such engines further include a second turbine, known as a power turbine, located downstream (aft) of the first turbine section. The power turbine extracts energy from the gas stream to power propulsor blades such as a fan or propeller.

The highest temperatures in the engine are those in the combustor and turbines. Any components of the engine which are located near these high temperature regions and which may be damaged by excessive heat must be cooled. Pressurized air for cooling these components is typically obtained from the compressor, fan duct, or otherwise drawn in from the atmosphere.

In most fan or propeller driven engines, the propulsor blades are located generally forward of the core engine. In such applications, the blade hub structures (base of the blades) operate in a relatively low temperature environment obviating the need for cooling the hub structures.

A recent improvement over the turbo-fan and turbo-prop engines described above is the unducted fan engine such as disclosed in U.S. patent application Ser. No. 071,594—Johnson, filed July 10, 1987. In the unducted fan engine, the power turbine includes counterrotating unducted fan blades. The fan blades are generally variable pitch blades to achieve optimum efficiency from the engine. To vary the pitch of each blade, each blade hub structure includes a bearing or other anti-friction coupling. If the engine has variable pitched blades, it must have a mechanism for varying the pitch of the blades. Blade pitch varying mechanisms located adjacent to each blade hub have been disclosed in U.S. Pat. No. 4,738,591, issued Apr. 19, 1988. Johnson discloses the location of the fan blades (propulsor blades) generally aft of the core engine and radially outwardly of the power turbine section. Because of the close proximity of the fan blades to the power turbine in such a configuration, the blade hub structures, under certain flight conditions, will be subjected to relatively high rates of heating (heat loads).

The air temperatures in the hub region, i.e., the region in the power turbine near the base of each blade, will vary depending upon flight conditions. For example, during periods of relatively high power demand, such as during take-off, turbine and combustor temperatures are elevated resulting in higher blade hub region temperatures. Blade hub structures and pitch varying mechanisms are generally made of lightweight cost effective materials. Such materials generally have relatively low temperature limits. Consequently, more cooling of the hub regions may be required during such high power take-off conditions than is normally required during cruise conditions. Increased ventilation of the blade hub region may also be beneficial or required during idle and reverse thrust operational even though the heat load is generally lower than take-off conditions. In contrast, temperatures stabilize at a lower level during steady state cruise operating conditions and less cooling is required. Since any cooling system will have a performance penalty associated with its use, it is advantageous to provide cooling only at the level required. Thus, means for automatically varying the amount of cooling air to the hub region of such blades is desired.

It is possible that some of the components in the hub region may be more sensitive to high temperatures than the other component. For example, hydraulic components of a pitch varying mechanism might not be able to withstand as great a temperature as the hub. Therefore, it may be desirable to provide more cooling to some components than to others.

Accordingly, it is an object of the present invention to provide an improved ventilation system for a power turbine section of a gas turbine engine.

It is another object of the invention to provide a ventilation system for a propulsor blade hub region within an unducted fan gas turbine engine.

It is another object of the present invention to provide an automatic ventilation system for controlling ventilation of the hub region of an unducted fan engine.

It is a further object of the present invention to provide a ventilation system for an unducted fan engine which apportions the ventilation to different locations.

SUMMARY OF THE INVENTION

In an illustrative embodiment, the present invention is shown as an air control or ventilation system for a power turbine section of an unducted fan gas turbine engine. The power turbine section includes first and second rotors coupled in driving relationship with a respective one of first and second counterrotating propulsors. Each of the propulsors includes a plurality of variable pitched propulsor blades. The propulsor blades are coupled to the associated rotor by corresponding blade hubs with the blades extending radially outwardly of the rotor. A first annular fairing is rotatable with the first propulsor and is interposed between the propulsor blades and its associated rotor. A second annular fairing is located axially of the first fairing and is rotatable with the second propulsor. The first fairing and the second fairing are differentially rotatable and are conformal with a nacelle or housing about the engine. The ventilation system includes an air control mechanism comprising platforms fixedly coupled to a radially inner end of at least some of the blades of the first propulsor. Each of the platforms is generally positioned in corresponding openings in the first fairing. In a first position corresponding with a first propulsor blade pitch, the platform is substantially conformal with the first fairing. In a second position, corresponding with a second propulsor blade pitch, an edge portion of the platform is displaced radially outwardly from the first fairing. When the blades are in the second position and rotating about the engine axis, the displacement of the edge portion with respect to the first fairing defines an opening for air to flow from outside the fairing to the annular cavity in which the blade hubs are located. Thus, ventilation is provided when the blades are in the second position. The air is allowed to exit the cavity through a single opening in the nacelle between the first and second fairings so that air flowing over the hubs of the first propulsor is not used to cool the hubs of the second propulsor thus avoiding the use of heated air for ventilation. The second propulsor blades hubs are cooled by ventilating air entering around the platforms of the blades of the second propulsor aft of the blades or by entering through holes or fixed scoops in the nacelle aft of the second propulsor. This ventilating air flows forwardly through the cavity within the second fairing and exits through the single opening between the fairings. Since the ventilation flows do not mix, there is no heat gain in either propulsor from the other of the propulsors. It may be noted that air exiting the opening between the fairings mixes with and is cooled by external air such that any air drawn into the aft scoops or holes is substantially fresh air.

BRIEF DESCRIPTION OF THE DRAWINGS

For a better understanding of the present invention, reference may be had to the following detailed description taken in conjunction with the accompanying drawing in which.

The exemplifications set out herein illustrate the preferred embodiments of the present invention and are not to be construed limiting either the scope of the invention or the scope of the disclosure in any manner.

DESCRIPTION OF THE PREFERRED EMBODIMENT

Figure 1:
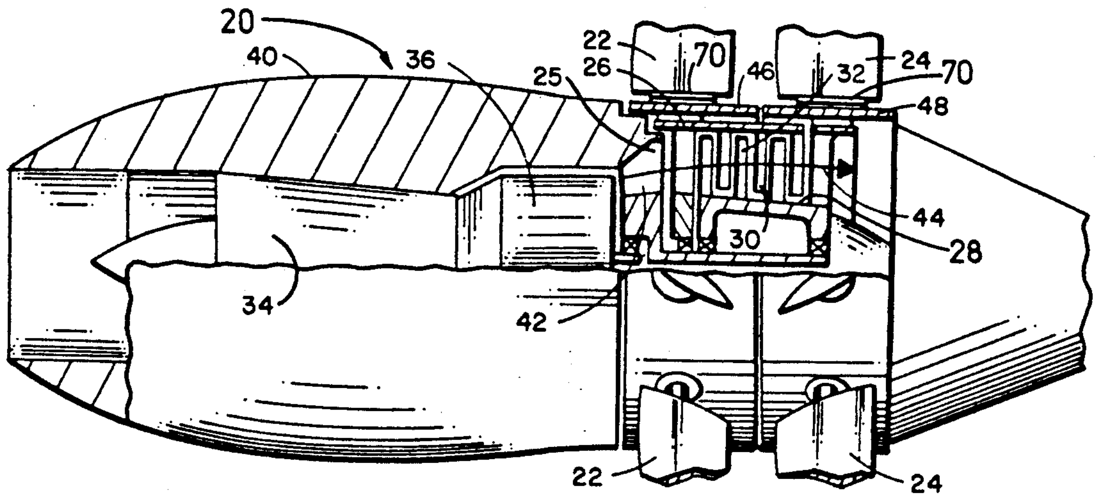
FIG. 1 is a side elevation view, in partial section, of an unducted fan type gas turbine engine incorporating the present invention.

FIG. 1 is a simplified, partial illustration of one form of unducted fan gas turbine engine 20. Forward and aft counterrotating propulsor blades 22 and 24 are disposed radially outwardly of a power turbine section 25. The power turbine 25 includes first and second counterrotating rotors 26 and 28. First and second sets of counterrotating turbine blades 30 and 32 are coupled to the first and second rotors 26 and 28, respectively. The forward and aft propulsor blades 22 and 24 are coupled respectively to the first and second rotors 26 and 28 and rotate therewith.

The engine 20 further includes an annular gas flowpath 42 formed through the first and second rotors 26 and 28. Pressurized air from a compressor section 34 is heated in a combustor 36 to form a high energy (high pressure/high temeperature) gas stream, denoted generally by arrow 44. The high energy gas stream 44 flows through the rotors 26 and 28 to turn the counterrotating turbine blades 30 and 32 for driving the counterrotating propulsor blades 22 and 24, respectively. A housing or nacelle 40 encompasses the engine 20. First and second cowls or fairings 46 and 48 are positioned radially inwardly of the propulsor blades 22 and 24, and are connected for rotation with the counterrotating rotors 26 and 28, respectively. The first and second fairings 46 and 48 are conformal with nacelle 40 to optimize the flow characteristics of air passing over the engine 20.

Figure 3:
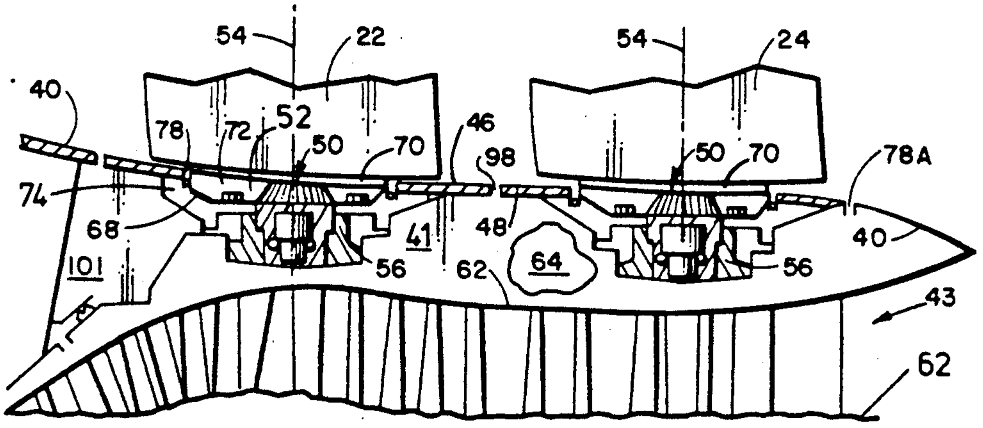
FIG. 3 is a side elevation view of the hub region of a blade.
Figure 2:
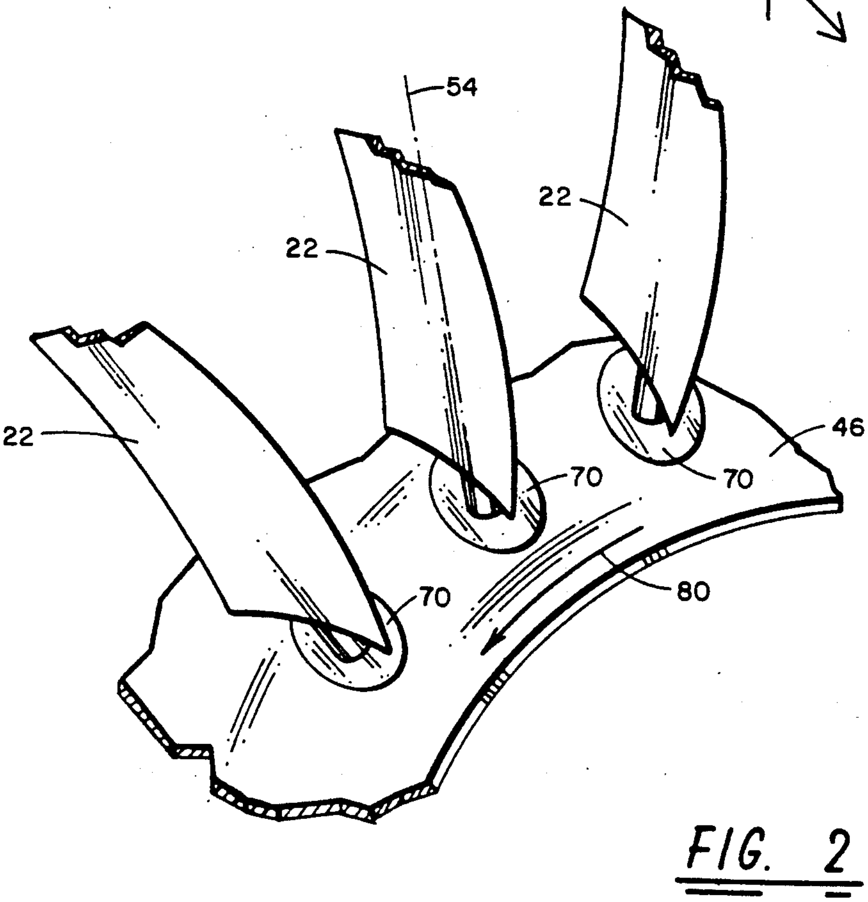
FIG. 2 is an isometric representation of the rotating fairing and blade shown in FIG. 1 with the blade set at a course pitch.

As seen more clearly in the partial sectional views of FIGS. 2-3, the blade hub 50 of each propulsor blade is disposed radially inwardly of the corresponding fairing 46 and 48. To further optimize the performance of the unducted fan engine 20, blade pitch varying mechanisms (not shown), such as that described in the aforementioned U.S. Pat. No. 4,738,591, are coupled to each of the blade hubs 50. Each fan blade has a pitch change axis 54 about which the blade may be turned to vary the pitch of the blade. Each blade hub 50 is coupled to a corresponding blade support which, in turn, is secured to a corresponding rotor. Bearing elements and retention apparatus, indicated generally at 56, couple the blade hub 50 to the blade support such that the blade hub 50 may be rotated about the blade axis 54.

The bearing elements and blade retention apparatus 56 of the forward propulsor blades 22 are located below a rotating cavity 72 bounded by a rotating annular member 68. The bearing elements and retention apparatus 56 for the aft propulsor blades 24 are located within the primary cavity 64 bounded by nacelle 40, power turbine structure 62 of turbine which rotates about block centerline 54 and with cavity 64 about engine centerline. A plurality of apertures or air distribution holes 88 extend through the annular member 68 from the forward cavity 72 (best seen in FIG. 5) and direct ventilation air downwardly and about the hub region 52. The air distribution holes 88 are positioned to distribute air about the hub structure while providing good flow characteristics even though there is only a small static pressure differential between cavity 72 and cavity 64.

The temperature in the cavity 64 will vary depending upon the operating state of the engine 20. For example, the power turbine operates at a higher temperature during take-off conditions than during steady state cruise conditions. The ventilation mechanism of the present invention provides varying amounts of cooling air to the hub region 52 depending upon the pitch setting of the propulsor blade 22. As shown in FIGS. 2 and 3, the platform 70 has a generally circular cross-section when viewed radially. In a cruise power position, the platform 70 conforms substantially to the shape of the fairing 46. Thus, in the circumferential direction, the surface at the perimeter of the platform 70 generally follows the contour of the fairing 46. In FIG. 2, the fairing 46 is generally cylindrical. However, the invention applies generally to conical as well as non-linearly sloped surfaces. The platforms 70 are also sized so that the scoops formed thereby are located in a region to maximize high static pressure to minimize reliance on dynamic pressure, i.e., ram drag, to pressurize the cooling cavities.

Figure 5:
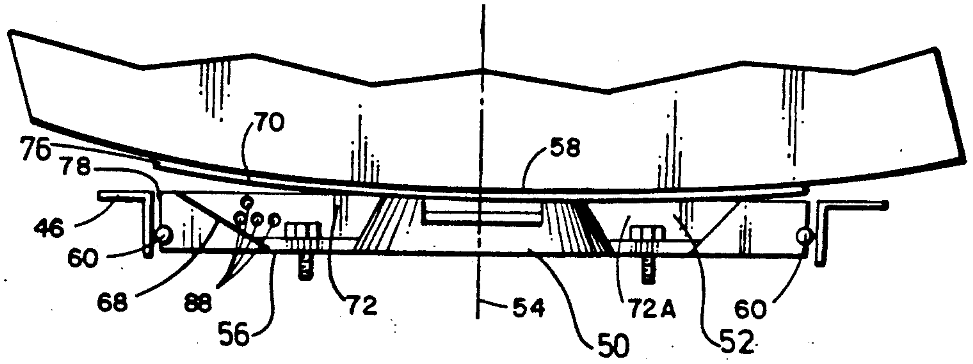
FIG. 5 is a simplified partial cross-section of a blade hub region illustrating the rotating ventilating cavity.
Figure 4:
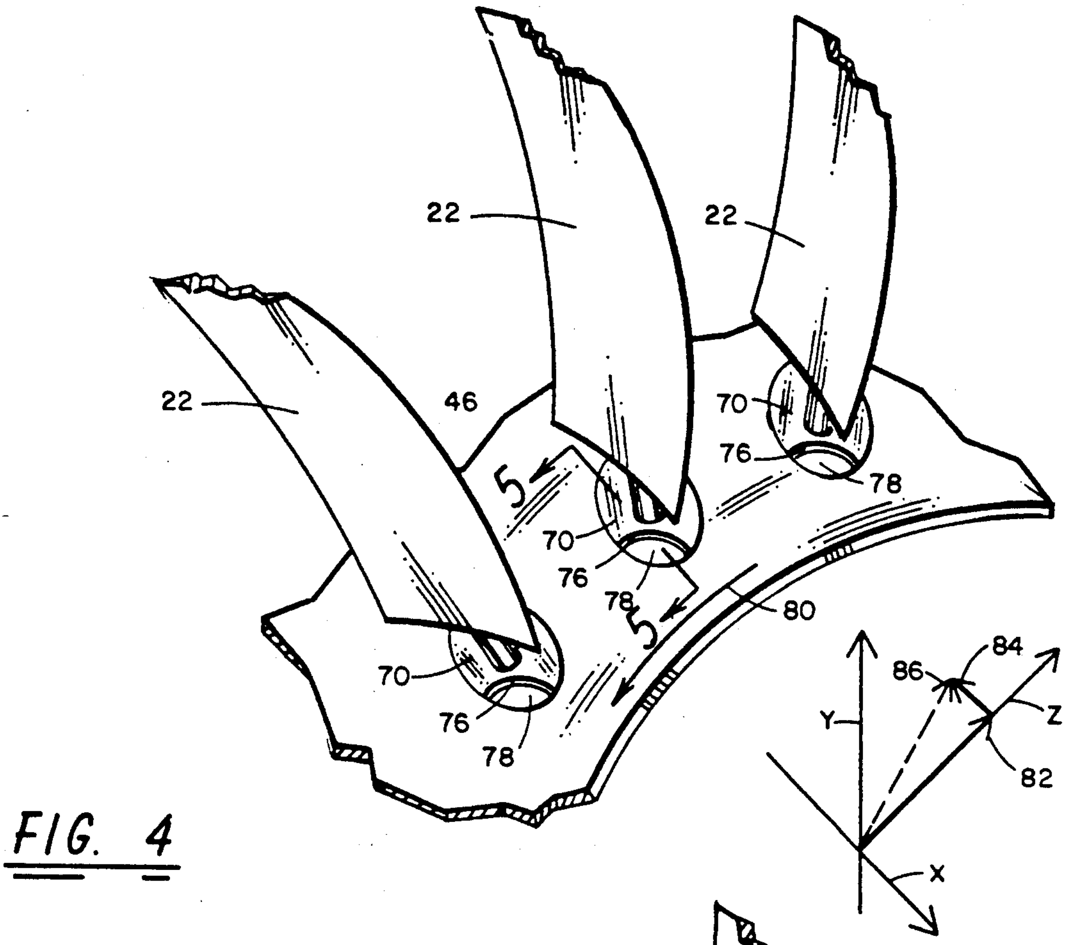
FIG. 4 is an isometric representation similar to that shown in FIG. 2 with the blade set at a more flat pitch.

FIGS. 4 and 5 show the ventilation mechanism as shown in FIGS. 2 and 3 with the platforms 70 in fairing 46 rotated to expose an edge portion 76 of each platform 70. The platform is rotated by varying the pitch of the propulsor blades to a configuration typical of a take-off power demand. As is evident from the geometry, the edge portion 76 is displaced radially outwardly from the fairing 46 and an opening 78 is defined between the edge portion 76 and the fairing 46. The opening 78 allows fluid communication from outside the nacelle 40 to the hub region 52. This allows cooling air to enter the hub region 52 and cool the hub 50 along with the associated bearing elements and retention apparatus 56. FIG. 5 illustrates in cross-section the effect of rotation of a platform 70 to define an air scoop or opening 78. Note that the annular member 68 is an annular member extending around the inner surface of platform 70 and having a central aperture 58 through which the blade hub 50 extends. The region 72 thus appears at two locations in the partial cross-sectional drawing even though only a single region 52 exists. In FIG. 5, it can be seen that the annular member 68 is sealed by an O-ring 60 to control the pressure differentials and air flow within cavity 64 by preventing air leakage around the annular member and platform 70.

During steady state cruise power operation of the engine 20, the pitch of each propulsor blade will be such that the corresponding platform 70 and the edge portion 76 substantially conform to the shape of the fairing 46. However, the turbine temperature is substantially reduced and externally obtained ventilation is not generally required during steady rotors 26, 28, formed cowl 41, exhaust nozzle 43 and bulkhead 101.

FIGS. 2 and 3 show the ventilation system with the propulsor blades set at "course" pitch for cruise condition of the engine 20. A generally disk-shaped platform 70 is fixedly attached to each propulsor blade. Thus, as the propulsor blades change pitch by rotating about their corresponding axes 54, the platforms 70 move therewith. The platforms 70 and nacelle 40 are shaped such that rotation of the platforms as the blades are changed to a predetermined pitch angle, e.g., flat pitch, an edge 76 is elevated above the fairing surface to create multiple air scoops. The platforms 70 are positioned within corresponding openings 74 in each of the first and second fairings 46 and 48. As can be seen in FIG. 5, the annular member 68 is fixedly coupled to the blade retention apparatus 56 for rotation about the engine centerline with the rotor 26. Furthermore, the annular member 68 is attached to platform 70 and rotates about the blade axis 54. Thus, the platform 70 and annular member 68 define an annular cavity 72 circumscribing blade hub region 52. In a preferred embodiment, the platform 70 and annular member 68 are split into two sections for assembly about the blade hub. The forward cavity 72 is isolated from the rear cavity 72A by a structural divider. The terms "forward" and "rear" are used with respect to the normal direction of travel of the engine 20 when mounted to an aircraft. However, the divider could be eliminated or perforated to allow air into the rear cavity 72A if additional air flow is desired. Note that cavity 72 is essentially a half-annulus cavity state cruise power operation. During take-off power operation of the engine 20, each propulsor blade will be set to a flatter pitch, thereby exposing the edge portion 76 and the opening 78. Thus, although the opening 78 is substantially closed during cruise conditions, increased cooling air is available for those periods of highest engine operating temperatures. The platform 70 may be arranged to provide some cooling air at cruise. The fairing 46 rotates in the direction indicated by the arrow 80. Thus, the direction of air flow relative to the fairing 46 due to the rotation of the fairing 46 is shown by the arrow 82. The direction of air flowing over the fairing 46 due to the forward motion of the engine 20 is generally axially aft as shown by arrow 84. The relative motion of air with respect to the platform 70 is shown by the arrow 86, the vector sum of arrows 82 and 84. It is to be understood from the foregoing that opening 78 is substantially forward facing with respect to the direction 86 of the air. This orientation provides an increase in available source air total pressure contributing to increased air flow rates for the hub region.

Figure 6:
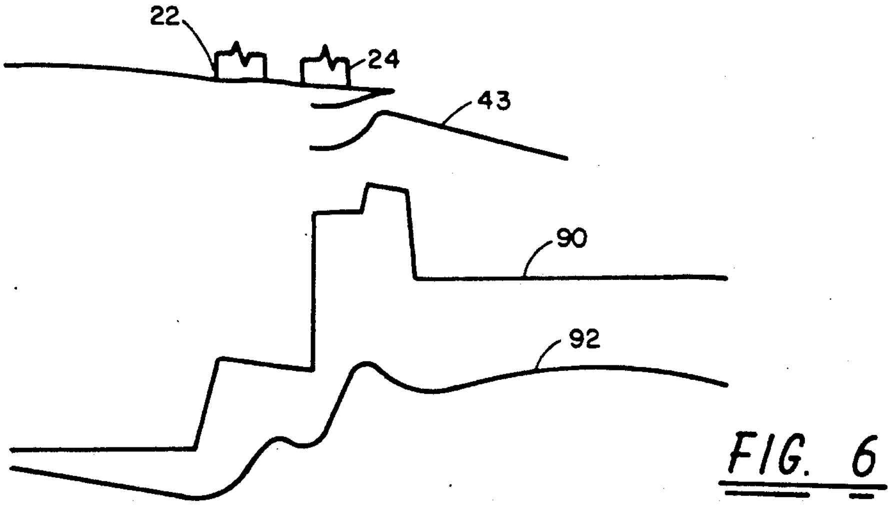
FIG. 6 is a graph illustrating air pressure along the external surface of the nacelle of the engine of FIG. 3.
Figure 8:
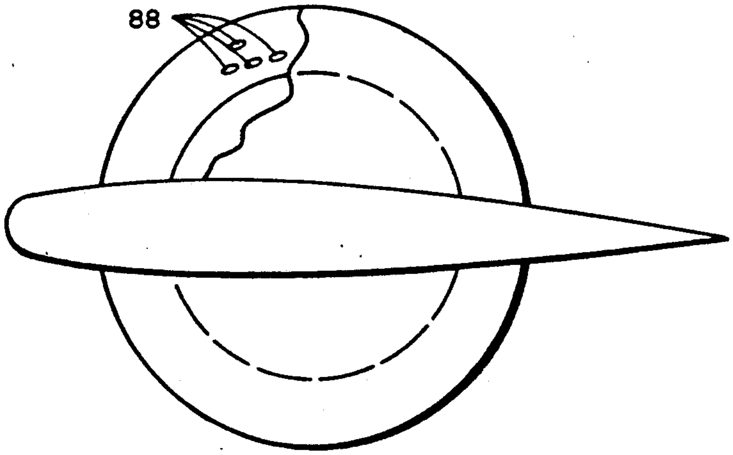
FIG. 8 is a view taken from the blade tip radially inward to show the blade hub.

Referring briefly to FIG. 6, there is shown a typical plot of pressure distribution axially over the outer nacelle surface of the turbine section of the engine 20. The static pressure, line 92, changes only slightly from front to back of the engine and is dependent on nacelle shape and operating power. The total pressure or dynamic pressure, line 90, are higher values attributable to propulsor rotation. The relatively low differential pressure through the cavity 64 limits the ability of the ventilation air to flow through the cavity. Furthermore, it is not desirable for the air which has flowed over and been heated by the forward propulsor apparatus to be used for cooling the aft propulsor apparatus. The heat rise over the forward propulsor can be as much as 100° F. Accordingly, it is desirable that the ventilation air entering cavity 72 be diverted away from the apparatus associated with the aft propulsor blades.

Figure 7:
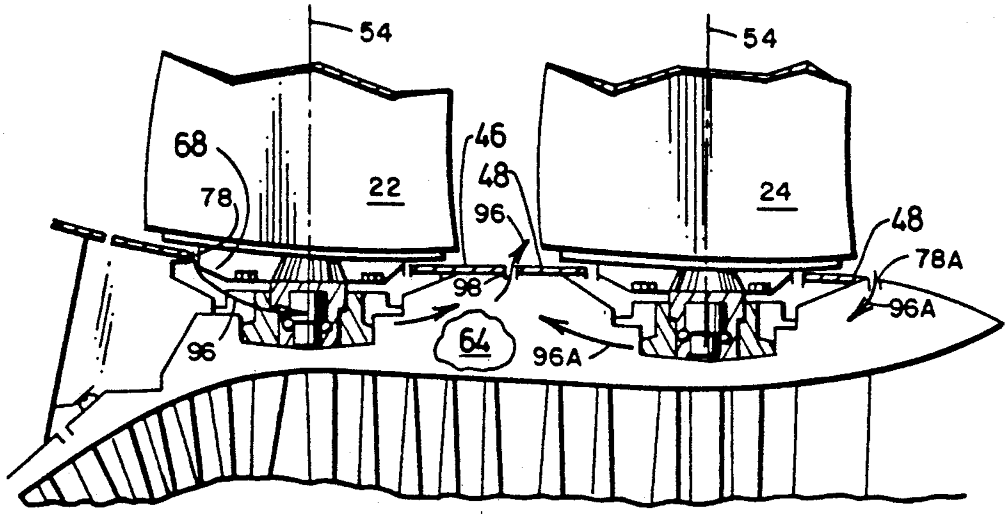
FIG. 7 illustrates air flow paths in the ventilation cavity of FIG. 3.

Reference is now made to FIG. 7 to illustrate air flow through one form of ventilation system in accordance with the present invention. Air, designated by arrow 96, enters the opening 78 and flows into the cavity 72. The annular member 68 restricts the flow of the air 96 and increases the static pressure at both the opening 78 and within the cavity 72 while reducing the velocity of the air entering the opening 78. The air 96 within the cavity 72 enters the into cavity 64 is distributed through the apertures in the region 88. The air then exits the cavity 64 through a gap 98 defined between the first fairing 46 and the second fairing 48. The exit gap 98 is large enough so that there is very little pressure drop across it. In this way, the air pressure within the cavity 64 is substantially equivalent to the air pressure radially outwardly of the gap 98. Additionally, the size of the gap 98 is sufficiently large such that, irrespective of the flow rate through the openings 78 and 78A, the air pressure within the cavity 64 is substantially equivalent to the air pressure radially outwardly of the gap 98. Thus, the flow through the system is nearly proportional to the area of the opening 78 only.

For a given area of the opening 78, the flow rate through the system is somewhat determined by the apertures 88 in addition to the scoop area of openings 78. If there are many apertures 88 and/or the apertures are large, the flow rate will be high but the static pressure within the hub region 52 will be low. If there are few apertures 88 and/or the apertures are small, the flow rate through the system will be relatively low but the static pressure in the region 52 will be relatively high. A high flow rate is generally desirable since it increases the cooling efficiency of an item to be cooled. However, if no resistance is provided by the annular member 68, air passing through the system would find the shortest path and possibly avoid cooling a portion of the hub 50 or mechanism 56. The annular member 68 and the associated apertures in the region 88 decrease the flow rate, but permit the precise selection of regions to be cooled. The greater the static pressure within the cavity 72, the greater the control in directing cool air to precise locations. This is because the higher the static pressure, the more uniform the pressure drop across each of the apertures. In other words, if there is a relatively high static pressure in the region and a relatively low flow rate, the pressure differential across an aperture near the apparatus 56 will be substantially equivalent to the pressure differential across an aperture near the hub 50. Thus, the flow rate through each aperture will be substantially uniform. However, if the apertures are too small, or if there are not enough apertures, the flow rate through each aperture will not be sufficient to provide adequate cooling to the hub 50 and apparatus 56. Thus, the size and number of apertures 88 must be selected to meet a proper balance between the flow rate and the static pressure. Since the engine 20 is hottest during the propulsor blade pitch corresponding to a take-off condition, the static pressure and flow rate be selected to provide the cooling needs at take-off. Additionally, if more cooling is needed in specific areas adjacent to the mechanism 56, for example, then more apertures can be located in those area. In this manner, the precise location of cooling may be selected.

The aft propulsor hub elements are ventilated in a somewhat different manner. The aft propulsors rotate in an opposite direction with respect to the forward propulsors and require that the pitch change be in an opposite direction. The static pressure along the outside surface of fairing 48 adjacent its platforms 70 during high power operation is such that it has been found that air can be drawn in from aft opening 78A near the trailing edge of blades 24. As shown by arrow 96A, air flow is from aft to forward of the rear propulsor hub assembly. The gap 98 between fairings 46 and 48 provides an exit path for this forward path. Even though the static pressure in cavity 64 may increase slightly from front to rear, the arrangement of air inlets 78 and 78A and outlet 98 and the rotation of the propulsor create a dynamic pressure which is effective to create a flow from aft to front of the rear propulsor. While the aft scoops or inlet apertures 78A could be arranged in the same manner as for the forward propulsor, the reduced flow requirements attributable to lower aft turbine temperatures and static local pressure allow the use of simple metering holes or scoops. Note that the openings 78A may be defined by scoops as shown in FIG. 3 or may be holes or scoops formed in the rotating nacelle aft of the aft propulsor. It is not necessary that the scoops be formed by rotation of platforms 70. The large extent of the cavity 64 may require multiple scoops, i.e., more scoops than there are blades. The scoops or holes may also be positioned within the rotating fairing 48 adjacent or aft of the blades 24.

The disclosed ventilation system distributes ventilation flow into the two cavities 72 and 64 through a plurality of inlets on each rotating fairing 46 and 48. The ventilation air is discharged through a single discharge port or sink 98 which is sufficiently large to cause the cavity pressure in cavity 64 to be nearly identical to its discharge static pressure thereby making the cavity pressure insensitive to discharge slot size and flow rate. The discharge slot comprises a gap 98 located between the two counterrotating fairings 46 and 48. In general, the system consists of a plurality of air inlets 78 in the fairing 46 and another plurality of air inlets 78A in the fairing 48 or in the exhaust nozzle portion of nacelle 40 just aft of the aft propulsor blades. In the disclosed arrangement, there is one air inlet 78 for each blade location in the forward propulsor and one or more inlet 78A for each blade location in the aft propulsor. The ventilation air drawn into the cavities 72 and 64 exits through a common sink formed by the natural slot 98 between the two counterrotating fairings. The rotating cavity ventilation flow is separated from the static nacelle ventilation flow by rotating annular member 101 and fairing 46. The ventilation flow from the forward scoops or inlets 78 flows aft through the forward rotating cavity or hub region 52 and exits through the single slot 98. The flow through the aft scoops or inlets 78A flows forward and also exits through the common single slot 98. This arrangement assures that the ventilation flows never pass from one rotating cavity to the other and thus never incur the resulting mixing heat gain which would occur if ventilation air circulating about one of the propulsor hub assemblies were to be mixed with the ventilation air circulating about the other propulsor hub assembly.

The exit slot or sink slot 98 is made large enough so that there is very little pressure drop across it. The pressure drop is selected to be just sufficient to give relatively uniform flow out the slot 98. In this manner, the cavity pressure in cavity 64 is always nearly identical to the slot external flow static pressure. The cavity pressure is relatively insensitive to ventilation flow rate. This assures that the pressure ratio across the scoops or inlets 78 or 78A is always maintained independent of scoop flow or cavity ventilation flow. Scoop flow is therefore nearly proportional to scoop area only. The scoop area or inlet 78 can be closely controlled in this system while the cavity pressure in cavity 64 is relatively insensitive to variations in the sink or exit slot area of slot 98 which is more difficult to control. A further advantage of the disclosed system is that the use of a single slot 98 makes cavity pressure dependent on only one slot pressure. Determination of cavity pressure in cavity 64 would be more difficult if multiple slots of different exit static pressures were used. The use of multiple scoop or inlet locations for inlets 78 and 78A and the single large sink slot 98 provides ventilation about the propulsor hub assemblies where it is needed while providing a stable ventilation system.

While the principles of the invention have now been made clear in an illustrative embodiment, it will become obvious to those skilled in the art, many modifications in structure, arrangement, portions and components used in the practice of the invention and otherwise which are particularly adapted for specific operating requirements without departing from those principles. Accordingly, it is intended that the description be interpreted as illustrative and not in a limiting sense and that the invention be given a scope commensurate with the appended claims.

We claim:

1. In a gas turbine engine having a rotor section coupled in driving relationship to forward and aft counterrotating propulsors each including a plurality of unducted propulsor blades extending radially outward of the engine and having hub portions adjacent the engine, a nacelle surrounding the engine and defining a first cavity within which the blade hub portions are located, a system for ventilating the blade hub portions comprising:

means for defining a plurality of second annular cavities, each of said second cavities circumscribing a corresponding one of the blade hub portions of the forward propulsors, each of said second cavities having a plurality of air distribution holes extending through said defining means adjacent selected portions of the corresponding blade hub portion;

means operatively associated with each of the forward propulsors for establishing an air scoop for directing air into said second cavities when the forward propulsor is at a predetermined pitch angle;

air outlet means positioned between the forward and aft propulsors for exhausting air from said first cavity; and means operatively associated with the aft propulsor for establishing a plurality of air inlets when the aft propulsor is at the predetermined pitch angle, said air inlets being aft of said aft propulsor, air entering said air inlets being directed forwardly over the blade hub portions of said aft propulsors toward said air outlet means.

2. The ventilating system of claim 1 wherein each of the forward and aft propulsors include a corresponding rotating annular fairing conforming with an outer surface of the nacelle, said air outlet means comprising a circumferential gap between said fairings.

3. The ventilating system of claim 1 wherein said air outlet means is sized to minimize pressure drop thereacross from inside to outside the nacelle.

4. The ventilating system of claim 2 wherein each of said fairings includes a plurality of circular platforms, each of said platforms being positioned in a corresponding aperture in said fairings centered about a hub portion of a corresponding one of the propulsor blades, the nacelle being shaped along the propulsor blade radius line such that a pitch change rotation of a propulsor blade to said predetermined pitch angle establishes an elevation of an edge of said platforms above said fairings for creating an air scoop.

5. In a gas turbine engine including a rotor section spaced from an outer nacelle to form a first cavity therebetween, first and second counterrotating propulsors each including a plurality of propulsor blades extending outwardly of the nacelle adjacent the rotor section, the propulsor blades each having hub portions extending into the cavity, first and second rotatable fairings associated respectively with the first and second propulsors, the fairings forming a continuation of the nacelle, a first group propulsor blades having a platform attached to a radially inner end thereof with the platform being generally positioned in a corresponding opening in the associated fairing and rotatable with the blade to establish a first position corresponding with a blade pitch for steady state cruise power operation of the engine in which an edge portion of the platform substantially conforms to a surface of the fairing, and in a second position corresponding with a blade pitch for take-off power operation of the engine in which the edge portion is displaced radially outwardly from the fairing surface to allow fluid communication from outside the engine to the first cavity, a ventilation system comprising:

means for defining a second cavity circumscribing the hub portions of the first propulsors, said defining means including a circumferential annular member substantially coextensive with and attached to the platform of a corresponding one of the first propulsor blades for rotation therewith, said annular member including a plurality of apertures extending therethrough for fluid communication between said second cavity and the first cavity, said apertures being sized to establish a predetermined fluid pressure drop across said annular member;

air outlet means for venting air from the first cavity to outside the engine, said outlet means comprising a slot between the counterrotating fairings, said slot being sized to establish a pressure drop sufficient to produce a uniform vent flow whereby pressure in the first cavity is relatively insensitive to ventilation flow rate; and a second group propulsor blades having a platform are located in the second propulsor, the platform rotatable with blade pitch change to define an air inlet aft of the blade when the blades are positioned for take-off power operation whereby air entering said aft air inlet flows in a forward direction into the first cavity and exits the first cavity through said slot between the first and second fairings.

6. In a gas turbine engine including a rotor section spaced from an outer nacelle to form a first cavity therebetween, first and second counterrotating propulsors each including a plurality of propulsor blades extending outwardly of the nacelle adjacent the rotor section, the propulsor blades each having hub portions extending into the cavity, first and second rotatable fairings associated respectively with the first and second propulsors, the fairings forming a continuation of the nacelle, a first group propulsor blades having a platform attached to a radially inner end thereof with the platform being generally positioned in a corresponding opening in the associated fairing and rotatable with the blade to establish a first position corresponding with a blade pitch for steady state cruise power operation of the engine in which an edge portion of the platform substantially conforms to a surface of the fairing, and in a second position corresponding with a blade pitch for take-off power operation of the engine in which the edge portion is displaced radially outwardly from the fairing surface to allow fluid communication from outside the engine to the first cavity, a ventilation system comprising:

means for defining a second cavity circumscribing the hub portion of the first propulsors, said defining means including a circumferential annular member substantially coextensive with and attached to the platform of a corresponding one of the first propulsor blades for rotation therewith, said annular member including a plurality of apertures extending therethrough for fluid communication between said second cavity and the first cavity, said apertures being size to establish a predetermined fluid pressure drop across said annular member;

air outlet means for venting air from the first cavity to outside the engine, said outlet means comprising a slot between the counterrotating fairings, said slot being sized to establish a pressur drop sufficient to produce a uniform vent flow whereby pressure in the first cavity is relatively insensitive to ventilation flow rate; and a plurality of openings circumferentially spaced about the engine aft of the second propulsor, said opening being positioned in a static pressure region such that air enters said openings and flows in a forward direction of the engine into the first cavity and exits the first cavity through said slot between the first and second fairings.

* * * * *